(No Model.)

W. H. McLEOD.
TURNBUCKLE.

No. 583,765. Patented June 1, 1897.

Witnesses:
A. E. Phyto.
Fred V. Hart.

Inventor.
William H. McLeod
By his Attorney
Benjamin Phillips

UNITED STATES PATENT OFFICE.

WILLIAM H. McLEOD, OF BOSTON, MASSACHUSETTS.

TURNBUCKLE.

SPECIFICATION forming part of Letters Patent No. 583,765, dated June 1, 1897.

Application filed May 4, 1896. Serial No. 590,242. (No model.)

*To all whom it may concern:*

Be it known that I, WILLIAM H. MCLEOD, a citizen of the United States, and a resident of Boston, in the county of Suffolk and Commonwealth of Massachusetts, have invented a new and useful Improvement in Turnbuckles, of which the following, taken in connection with the accompanying drawings, is a specification.

As turnbuckles have heretofore been constructed, when set in exposed locations, especially upon the stays, braces, and other portions of the rigging of steamers and sailing crafts, they are very liable to become rusty and set and to such a degree that they become inoperative and cannot be taken apart for the purpose of cleaning or other purposes without disrupting the parts and destroying the turnbuckle.

The object of the present invention is to obviate the defect above noted and generally to improve the construction of devices of this class.

To the above end the present invention consists in providing in a turnbuckle a hollow-ended body or connecting portion internally and externally threaded at or near its hollow end and provided at its hollow end with a series of longitudinal slots, a threaded bolt which is engaged by the internal threads, and a nut which engages the external threads.

The present invention further consists in providing at the hollow end of the body a tapered projection and in providing upon the nut a tapered cap fitted to said projection. The present invention also consists of further improvements in the form and arrangement of the nut and of the devices and combinations of devices hereinafter more specifically set forth and claimed.

A preferred form of the present invention is illustrated by the accompanying drawings, in which—

Figure 1:
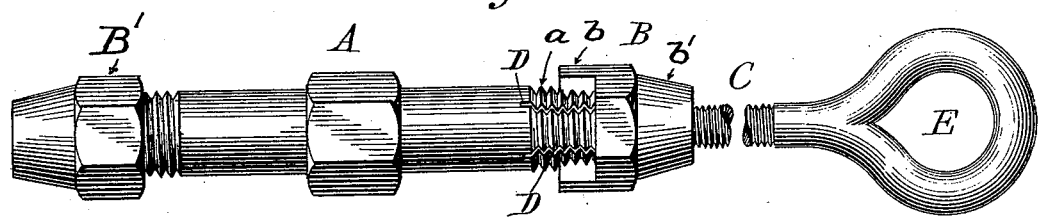
Figure 2:
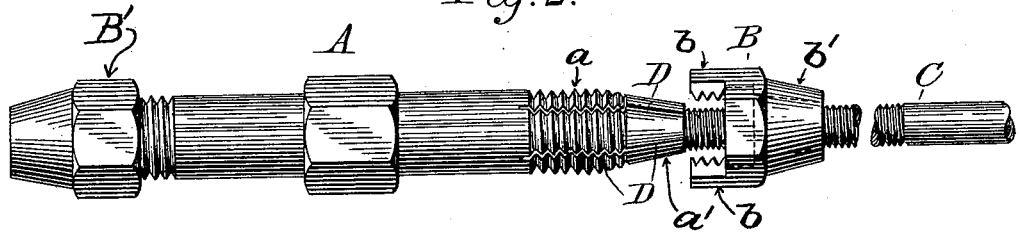
Figure 3:
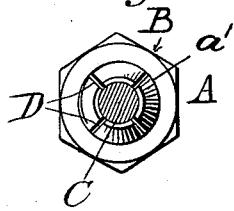

Figure 1 is a side elevation of a turnbuckle embodying the present invention. Fig. 2 is a similarly-taken view showing a changed position of the nut. Fig. 3 is an end view taken at the right of Fig. 1, showing the threaded bolt in section.

Similar letters of reference refer to similar parts in the several views.

Referring to the drawings, A represents a hollow-ended body or connecting portion, which is provided at its hollow end with a series of open-ended slots D D, &c. The slots D D open at the hollow end of the body A and extend longitudinally along the body A toward its central portion, preferably substantially through the thread portion of the body A.

The function of the slots D D, &c., is to allow the hollow end of the body A to expand or contract for the purposes hereinafter explained, and said slots D may be one or more in number, as required to secure the desired result.

The portion a of the body A adjacent to its hollow end is externally and internally threaded, the internal threads being adapted to engage the threaded bolt C and the external threads to be engaged by the nut B. The bolt C forms the connection with the brace, stay, or rigging to which the buckle is applied and may be conveniently provided with the usual eye E or other suitable means of connection.

In the form of the present invention shown in the drawings I have provided at the hollow end of the body A a tapered extension $a'$, which coöperates with a tapered cap upon the nut B to contract the hollow end of the body A and to bring its interior threads into close engagement with the bolt C.

The nut B may be made in the usual form, as shown at B', but I prefer a construction in which the threads are formed on a series of laterally-projecting lugs b b, thereby reducing the portion of the nut B which is liable to become rusted onto the body A, as far as practical, so that the nut B can at all times be readily removed. It will be of course noted that any rust or other impeding substance which collects between the lugs b b can be readily removed before attempting to start the nut B.

In the preferred form of my invention the nut B is provided with a tapered cap b, which is internally fitted to the tapered extension $a'$ on the body A, the arrangement being such that as the nut B is set up on the threaded portion a the cap $b'$, engaging the tapered extension $a'$, slightly contracts the hollow end of the body A and causes its interior threads to engage more firmly with the threads on the bolt C. It will be noted that the taper extension $a'$ is not exteriorly threaded, but the interior threads of the body A extend to the outer end of said extension. (See Fig. 3.)

The nut B' at the left of Figs. 1 and 2 is shown merely to illustrate another form of the nut B, and any convenient device for attaching the buckle to its connections may be substituted therefor.

I desire further to say that it is not an essential feature of the present invention that the setting up of the nut B should contract the hollow end of the body A, its essential function being simply to prevent the same from expanding, and while I prefer to use the construction hereinbefore described for its many obvious advantages I do not wish to limit my invention thereto, but consider that a construction in which the tapered extension $a'$ and the cap $b'$ are omitted and the usual form of nut used clearly within the scope of the present invention. The body A has been described herein as "hollow-ended," it being essential that provision should be made at one end of the body A to receive the rod C, and any construction having such provision is considered as embraced in terms above quoted.

The operation of my invention is obvious to one skilled in the art from the foregoing description of its form and arrangement.

I therefore claim as novel and desire to secure by Letters Patent of the United States—

1. A turnbuckle comprising a hollow-ended body portion, externally and internally threaded at or near its hollow end, a series of longitudinal slots at said hollow end, a nut engaging the external threads, and a threaded bolt engaged by the internal threads, substantially as described.

2. A turnbuckle comprising a hollow-ended body portion, slotted and internally and externally threaded at or near its hollow end, a tapered extension at the hollow end of the body, a threaded bolt engaged by the internal threads, a nut engaging the external threads, and provision on said nut for engaging said tapered extension to contract the hollow end of the body, substantially as described.

3. In a turnbuckle having an externally-threaded body or connecting portion, a nut engaging said body, having its threaded portions formed solely upon laterally-projecting lugs, substantially as described.

4. In a turnbuckle a hollow-ended body portion, a series of longitudinal slots at said hollow end externally and internally threaded at or near its hollow end, a threaded bolt engaged by said internal threads, a tapered extension beyond the external threads, and a nut arranged to engage the external threads, and provided with a tapered cap to engage the tapered extension on the body.

In testimony whereof I have hereunto set my hand, in the presence of two attesting witnesses, this 1st day of May, 1896.

WILLIAM H. McLEOD.

Witnesses:
A. E. WHYTE,
FRED V. HART.